United States Patent
Sakurada

(10) Patent No.: US 9,710,096 B2
(45) Date of Patent: Jul. 18, 2017

(54) INFORMATION PROCESSING APPARATUS AND METHOD, AND PROGRAM FOR REMOVING DISPLAYED OBJECTS BASED ON A COVERED REGION OF A SCREEN

(75) Inventor: Akiko Sakurada, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 12/564,953

(22) Filed: Sep. 23, 2009

(65) Prior Publication Data

US 2010/0088633 A1    Apr. 8, 2010

(30) Foreign Application Priority Data

Oct. 6, 2008  (JP) .............................. P2008-259621

(51) Int. Cl.
| | | |
|---|---|---|
| *G06F 3/041* | (2006.01) | |
| *G06F 3/0484* | (2013.01) | |
| *G06F 3/0481* | (2013.01) | |
| *G06F 3/0488* | (2013.01) | |

(52) U.S. Cl.
CPC .......... *G06F 3/0416* (2013.01); *G06F 3/0481* (2013.01); *G06F 3/0484* (2013.01); *G06F 3/0488* (2013.01)

(58) Field of Classification Search
CPC .. G06F 3/04886; G06F 3/0481; G06F 3/0484; G06F 3/0488; G06F 3/0416; G06F 3/0412
USPC ......................................................... 715/702
See application file for complete search history.

(56) References Cited

U.S. PATENT DOCUMENTS

| | | | | |
|---|---|---|---|---|
| 6,073,036 | A * | 6/2000 | Heikkinen et al. ......... | 455/550.1 |
| 6,259,436 | B1 * | 7/2001 | Moon et al. .................. | 345/173 |
| 7,692,629 | B2 * | 4/2010 | Baudisch et al. ............ | 345/157 |
| 2002/0067346 | A1 * | 6/2002 | Mouton ........................ | 345/173 |
| 2004/0239649 | A1 * | 12/2004 | Ludtke .......................... | 345/173 |
| 2007/0097096 | A1 * | 5/2007 | Rosenberg .................... | 345/173 |
| 2008/0141149 | A1 * | 6/2008 | Yee et al. ...................... | 715/764 |
| 2008/0168403 | A1 * | 7/2008 | Westerman et al. ......... | 715/863 |
| 2008/0259053 | A1 * | 10/2008 | Newton ........................ | 345/175 |
| 2008/0291430 | A1 * | 11/2008 | Nozawa .......................... | 356/73 |
| 2009/0002326 | A1 * | 1/2009 | Pihlaja ........................... | 345/173 |
| 2009/0184935 | A1 * | 7/2009 | Kim ............................... | 345/173 |

FOREIGN PATENT DOCUMENTS

| | | |
|---|---|---|
| JP | 3-288891 | 12/1991 |
| JP | 9-190171 | 7/1997 |
| WO | WO 2007/107368 | 9/2007 |

* cited by examiner

*Primary Examiner* — Kieu Vu
*Assistant Examiner* — Blaine Basom
(74) *Attorney, Agent, or Firm* — Paratus Law Group, PLLC

(57) ABSTRACT

An information processing apparatus is provided which includes a display unit 110 for displaying an image on a screen based on image data, a contact and proximity detection unit 161 for detecting contact or proximity between a subject of operation and the surface of the display unit, a covered time measurement unit 165 for measuring covered time when the screen is covered by the contact or proximity of the subject of operation, and an object display control unit 166 for removing an object displayed in a covered region on the screen covered by the subject of operation from the covered region when the covered time is longer than a predetermined time.

21 Claims, 11 Drawing Sheets

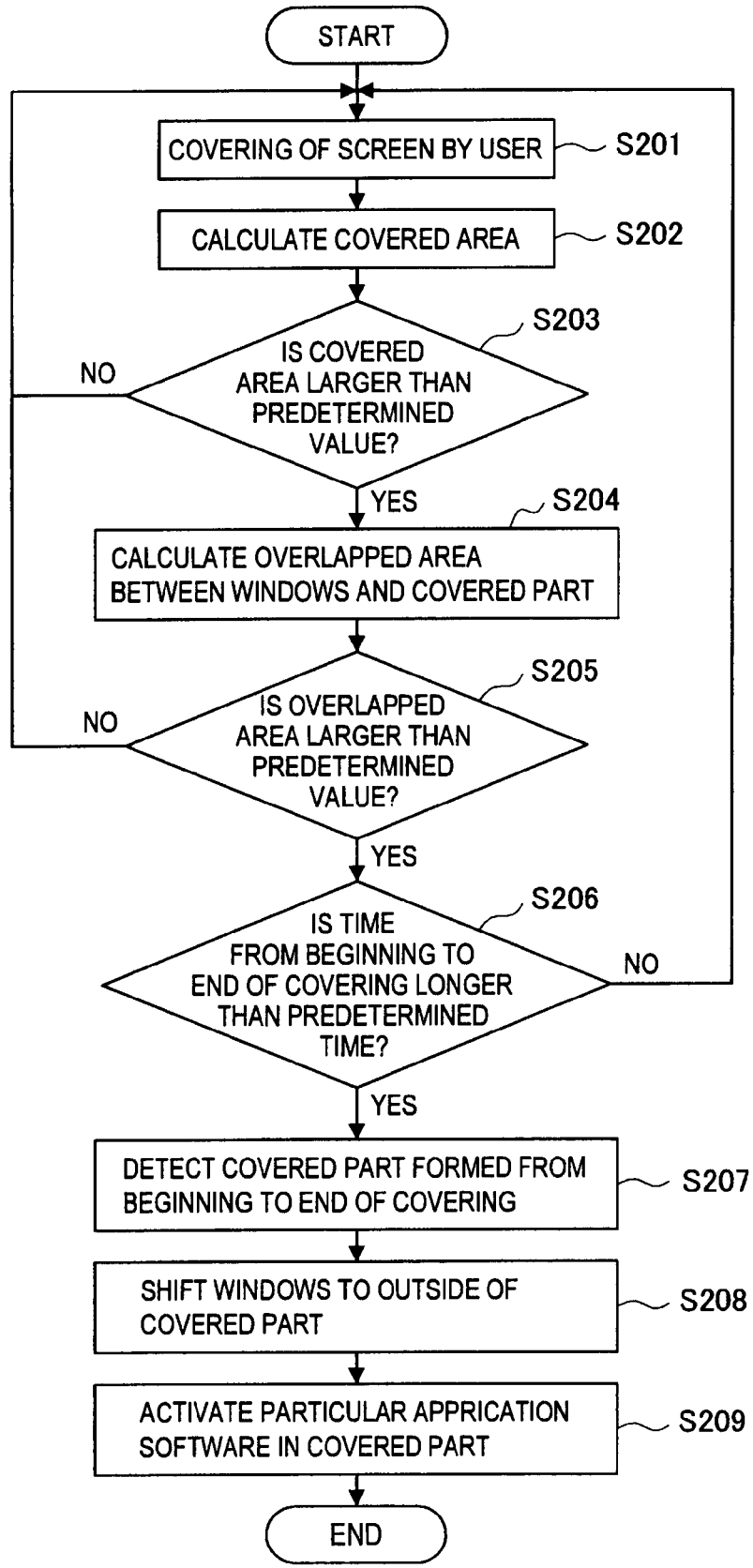

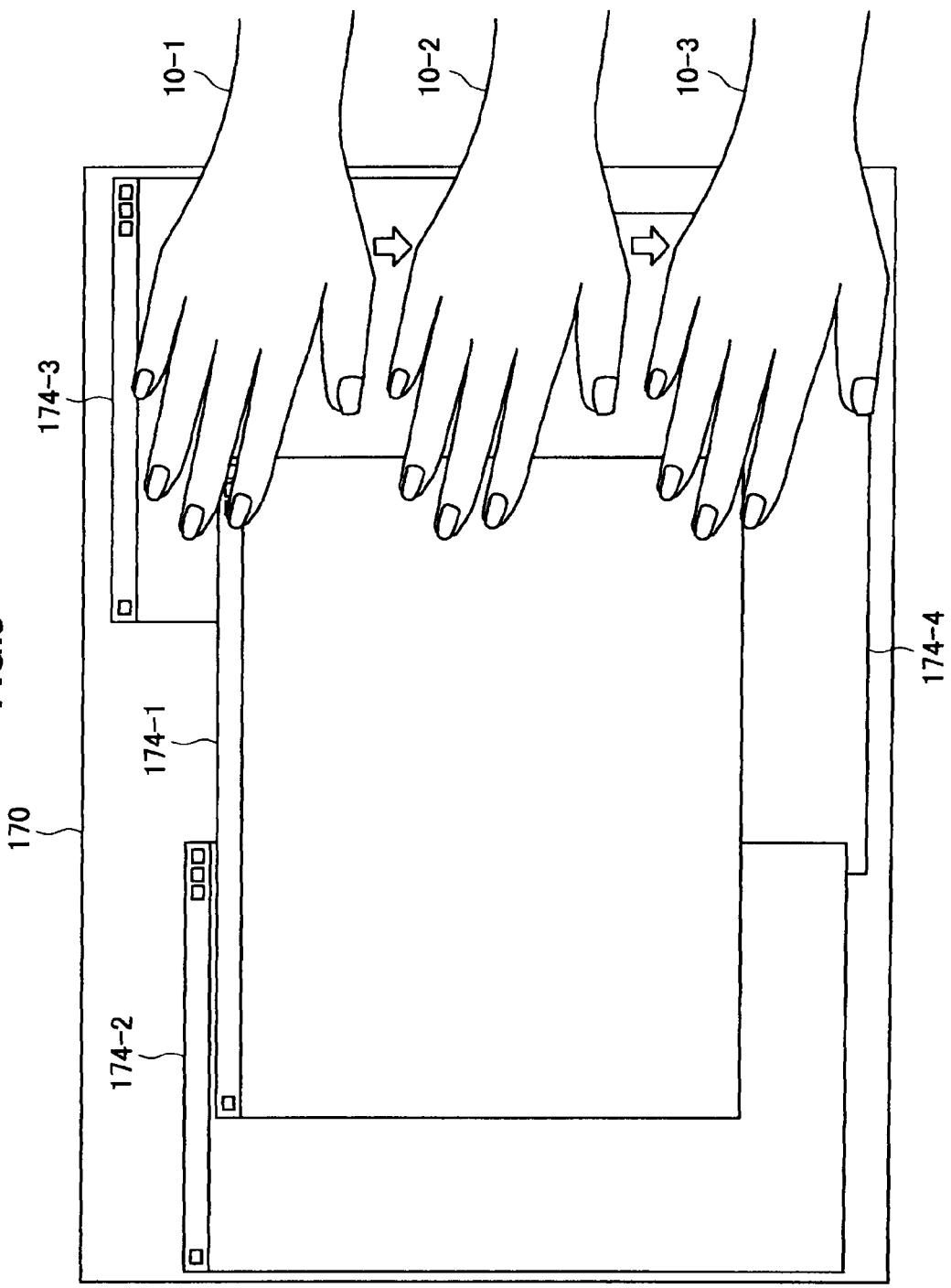

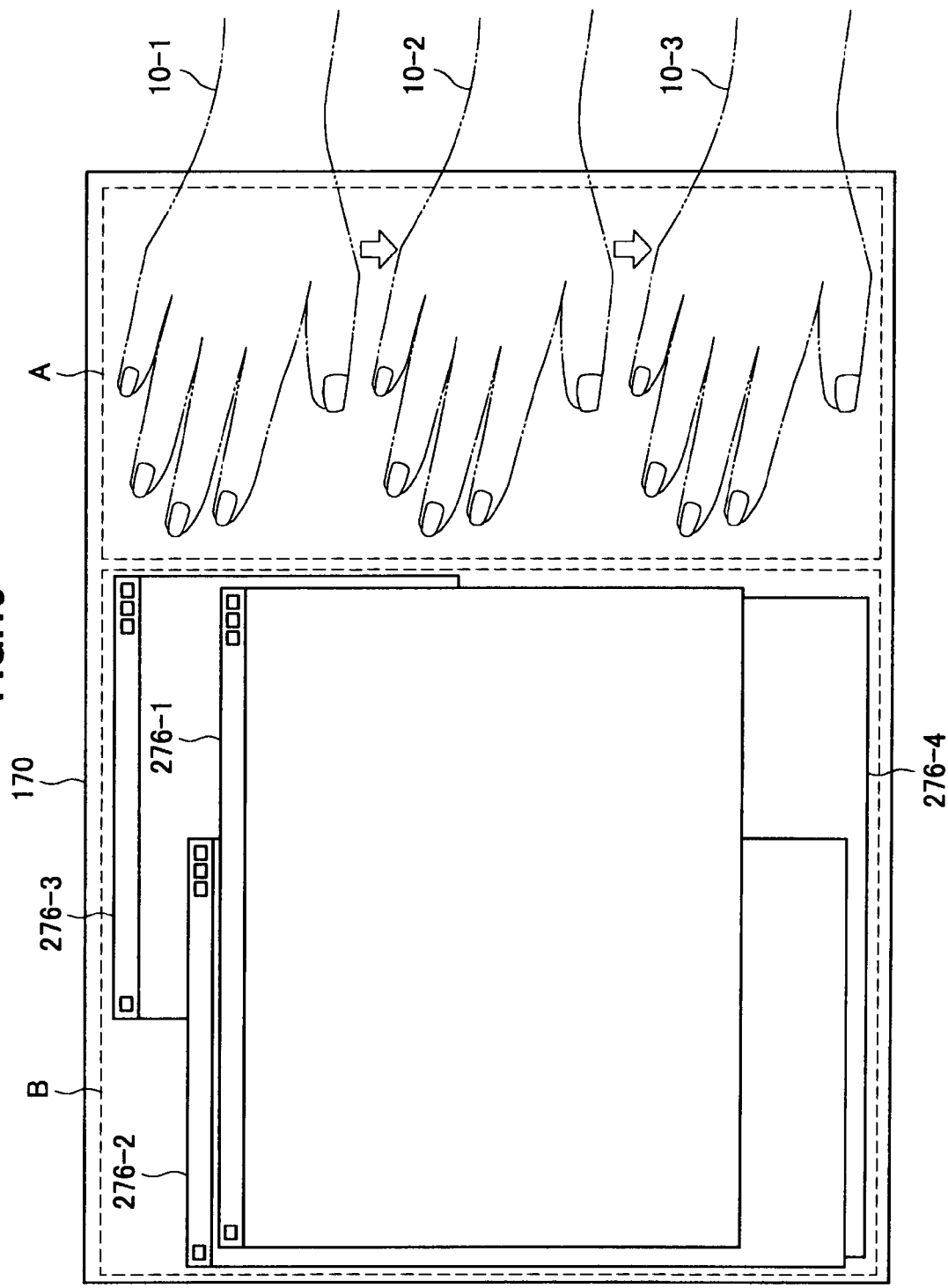

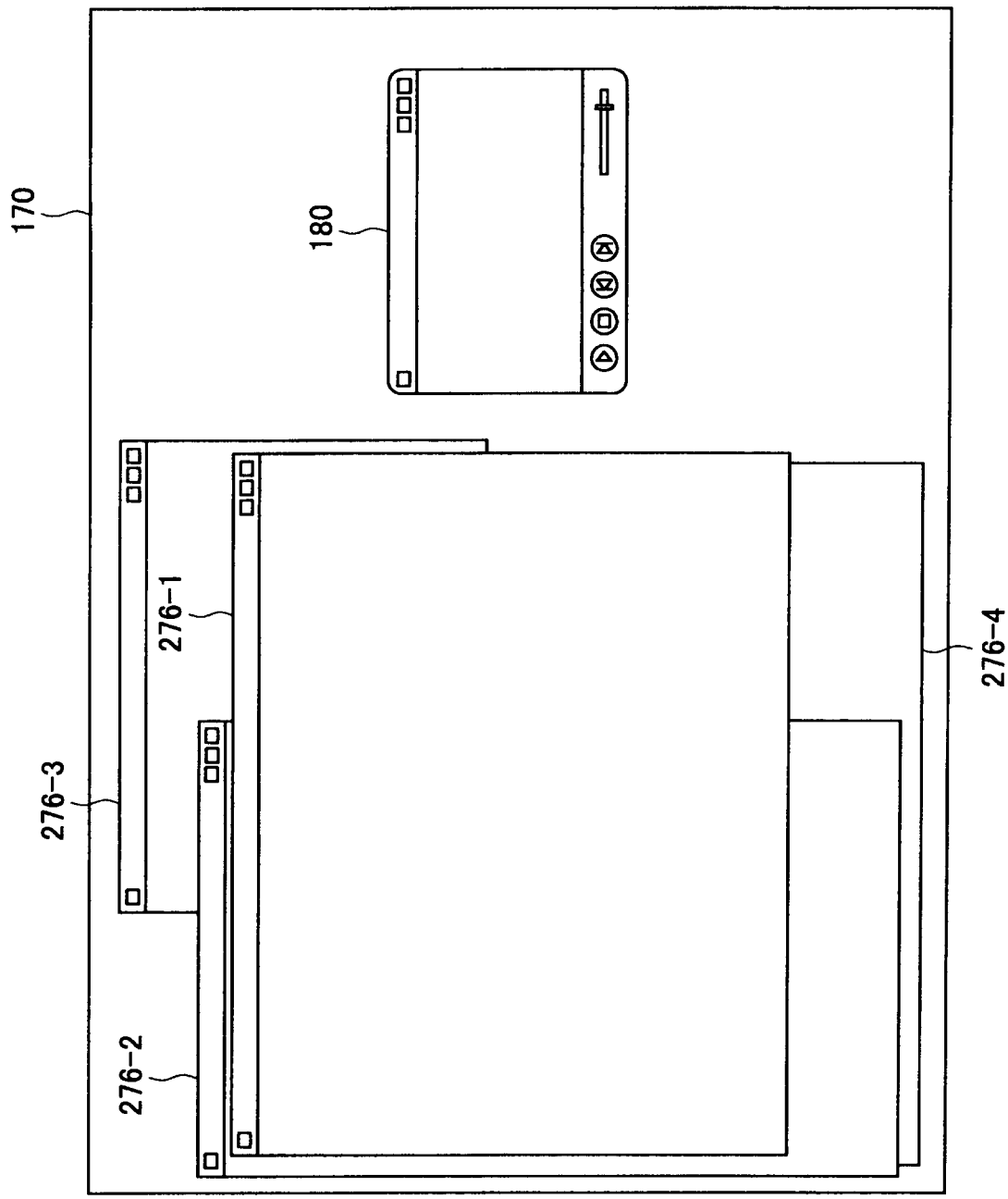

INFORMATION PROCESSING APPARATUS AND METHOD, AND PROGRAM FOR REMOVING DISPLAYED OBJECTS BASED ON A COVERED REGION OF A SCREEN

BACKGROUND OF THE INVENTION

Field of the Invention

The present invention relates to an information processing apparatus and method, and a program.

Description of the Related Art

In computer devices such as personal computers, a GUI (graphical user interface) is used for improving user operability. A GUI can provide users with intuitive operation by using computer graphics and a pointing device.

For example, on the screen of a computer device there are displayed graphical images such as windows (objects), icons, and buttons. A user selects a graphical image such as a window, an icon or a button with a pointing device such as a mouse. By such a graphical image being selected, the computer device performs the operation which is desired by the user.

SUMMARY OF THE INVENTION

When a plurality of windows are displayed being arranged in an overlapping manner on the desktop, there have been operation procedures to secure on the desktop an area where no window is displayed, as follows. (1) To shift or reduce the size of each window on the desktop, with a pointing device such as a mouse or a pointer. (2) To minimize all windows at once with the shortcut key.

For example, when icons were arranged on the desktop and a plurality of windows were displayed being arranged in an overlapping manner over the icons, in order to select an icon, it was necessary to shift or reduce the size of a window one by one or to minimize all the windows. However in the case of the above procedure (1), it was necessary to perform the operation of shifting or reducing the size of a window one by one with a mouse or the like, so that there was an issue of taking a lot of effort. Furthermore, in the case of the above procedure (2), all the windows were minimized at the same time, so that the operation of leaving the necessary window displayed while minimizing the other windows might not be performed. Therefore, it was an issue that the necessary information became unable to be promptly referred to.

The present invention has been made in view of the above issues, and it is desirable to provide a novel and improved information processing apparatus and method and program capable of promptly and simply removing an object displayed in a covered region on a screen covered by a subject of operation from the covered region.

According to an embodiment of the present invention, there is provided an information processing apparatus which includes a display unit for displaying an image on a screen based on image data, a contact and proximity detection unit for detecting contact or proximity between a subject of operation and the surface of the display unit, a covered time measurement unit for measuring covered time when the screen is covered by the contact or proximity of the subject of operation, and an object display control unit for removing an object displayed in a covered region on the screen covered by the subject of operation from the covered region when the covered time is longer than a predetermined time.

The information processing apparatus may further include a covered area calculation unit for calculating a covered area of the covered region. The object display control unit may remove the object displayed in the covered region from the covered region when the covered area is larger than a predetermined value.

The information processing apparatus may further include an overlapped area calculation unit for calculating an overlapped area where the covered region and the object are overlapped each other. The object display control unit may remove the object displayed in the covered region from the covered region when the overlapped area is larger than a predetermined value.

The object display control unit may shift the object displayed in the covered region to a region outside the covered region and display the object.

When the object is plural, the object display control unit may display the plurality of objects in alignments in the region outside the covered region on the screen.

The information processing apparatus may further include a new object display control unit for displaying a new object in the covered region after the object displayed in the covered region is removed from the covered region.

According to another aspect of the present invention, there is provided an information processing method which includes the steps of displaying an image on a screen of a display unit based on image data, detecting contact or proximity between a subject of operation and the surface of the display unit, measuring covered time when the screen is covered by the contact or proximity of the subject of operation, and removing an object displayed in a covered region on the screen covered by the subject of operation from the covered region when the covered time is longer than a predetermined time.

According to another aspect of the present invention, there is provided a program which allows a computer to perform the steps of displaying an image on a screen of a display unit based on image data, detecting contact or proximity between a subject of operation and the surface of the display unit, measuring covered time when the screen is covered by the contact or proximity of the subject of operation, and removing an object displayed in a covered region on the screen covered by the subject of operation from the covered region when the covered time is longer than a predetermined time.

According to the present invention, an object displayed in a covered region on a screen covered by a subject of operation can be promptly and simply removed from the covered region.

BRIEF DESCRIPTION OF THE DRAWINGS

FIG. 8 is a flowchart showing the operation of the information processing apparatus of a second example according to the embodiment;

FIG. 9 is an explanatory diagram showing images displayed on the desktop of the display panel and the operation by a user;

FIG. 10 is an explanatory diagram showing the images displayed on the desktop of the display panel and the operation by the user; and FIG. 11 is an explanatory diagram showing the images displayed on the desktop of the display panel and the operation by the user.

DETAILED DESCRIPTION OF EMBODIMENT

Figure 1:
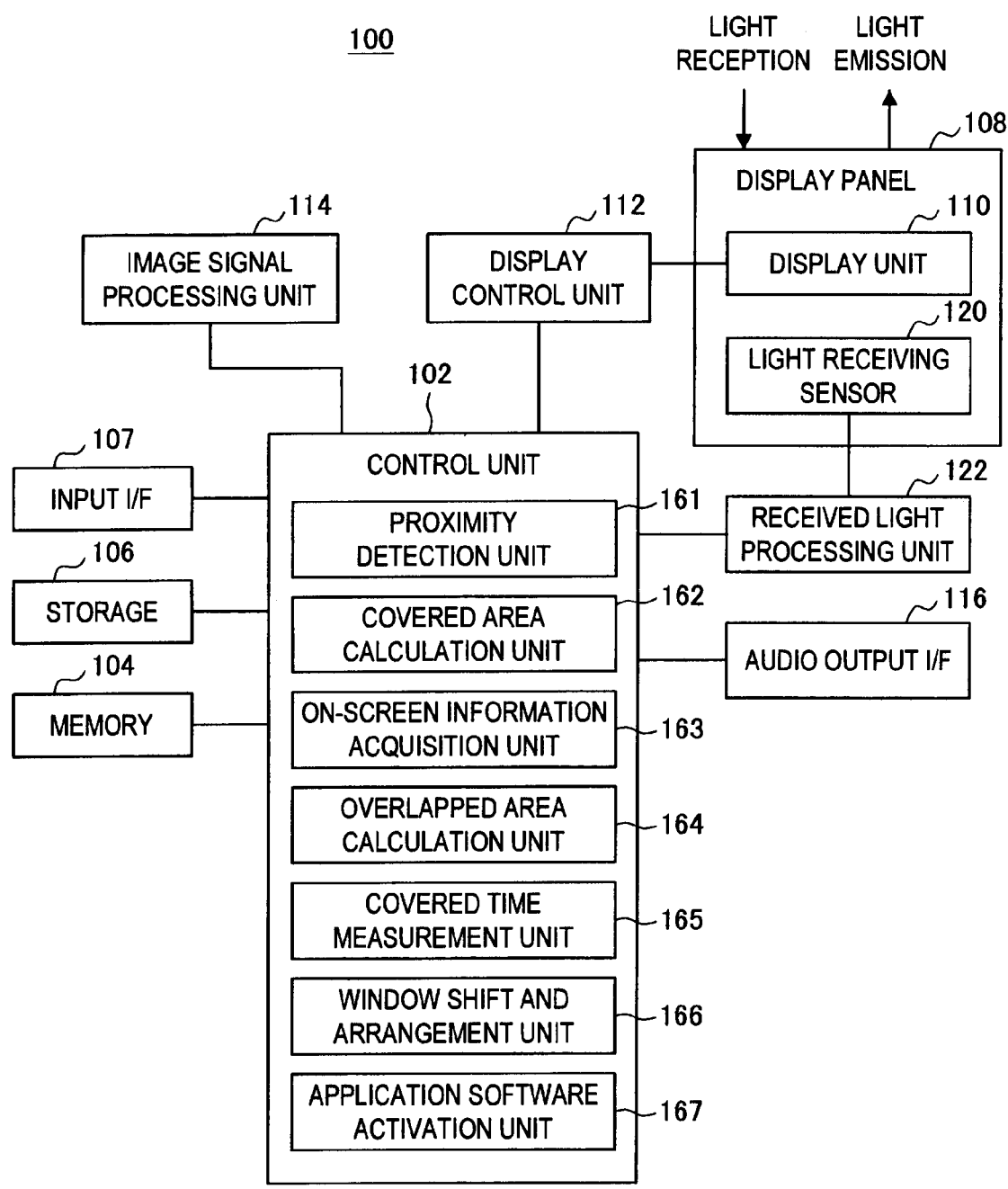
FIG. 1 is a block diagram showing an information processing apparatus 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description will be given in the following order:

1. Configuration of an Embodiment
2. Operation of a First Example According to the Embodiment
3. Operation of a Second Example According to the Embodiment 1. Configuration of an Embodiment First, an information processing apparatus 100 according to an embodiment of the present invention will be described. FIG. 1 is a block diagram showing the information processing apparatus 100 according to the embodiment. The information processing apparatus 100 according to the embodiment includes, for example, a control unit 102, a memory 104, a storage 106, an input I/F 107, an image signal processing unit 114, a display panel 108, a display control unit 112, an audio output I/F 116, and a received light processing unit 122. Although the present embodiment gives a description of when the display panel 108 is integrally set up with the information processing apparatus 100, the present invention can also be applied to a case where the information processing apparatus 100 and the display panel 108 are separately set up.

The information processing apparatus 100 is, for example, a personal computer, an audio player, a media player, a PDA (personal digital assistant), a cell phone, and a digital camera.

The control unit 102 includes, for example, a micro computer which is configured to combine a CPU (central processing unit), a ROM (read only memory), RAM (random access memory) and the like. The control unit 102 functions as an arithmetic processing device and a control device by a program, and controls, for example, each of the above components of the information processing apparatus 100.

The memory 104 is configured, for example, by a memory unit such as a RAM, a ROM, and/or a cache memory, and has a function to temporarily store, for example, data relating to the processing and the operation program of the CPU of the control unit 102.

The storage 106 is, for example, a hard disk, an optical disk, or a flash memory, and is a control unit for storing data over a long period of time. For example, the storage 106 stores music data and image data such as video or photos. The storage 106 stores music data and image data after data reception control processing and accumulation control processing are performed in the control unit 102.

The input I/F 107 is, for example, a USB terminal or an IEEE 1394 terminal, and is an interface connectable to an external device. A variety of data including various information and instructions are input to the information processing apparatus 100 via the input I/F 107.

The display panel 108 includes, for example, a display unit 110 and a light receiving sensor 120, and receives user's operation by the light receiving sensor 120 detecting a subject of operation such as a finger or hand of a user, or a stylus. The display panel 108 according to the present embodiment, unlike a touch screen, does not need contact on the screen and receives user's operation by detecting proximity to the screen. Then, the display panel 108 selects an item displayed on the screen, and changes a display by scrolling, or scaling up or down, the screen.

The display unit 110 is an LCD (liquid crystal display), for example, and is controlled by the display control unit 112. The display unit 110 displays various menu screens or images based on the image data. The light receiving sensor 120 receives the light incident on the display surface of the display unit 110 from the outside, and converts the received light into electrical signals. The light receiving sensor 120 sends the generated electrical signals to the received light processing unit 122.

The image signal processing unit 114 performs signal processing on image signals generated in the received light processing unit 122. The image signal processing unit 114 performs on the image signals various necessary signal processings such as resolution conversion which converts the image signals into the number of pixels of the display unit 110, brightness correction, color correction, and gamma correction.

The audio output I/F 116 is a terminal such as a phone plug, for example, and is connected to an external device such as a headset or a speaker. The audio output I/F 116 outputs the reproduced audio data to the external device.

Figure 2:
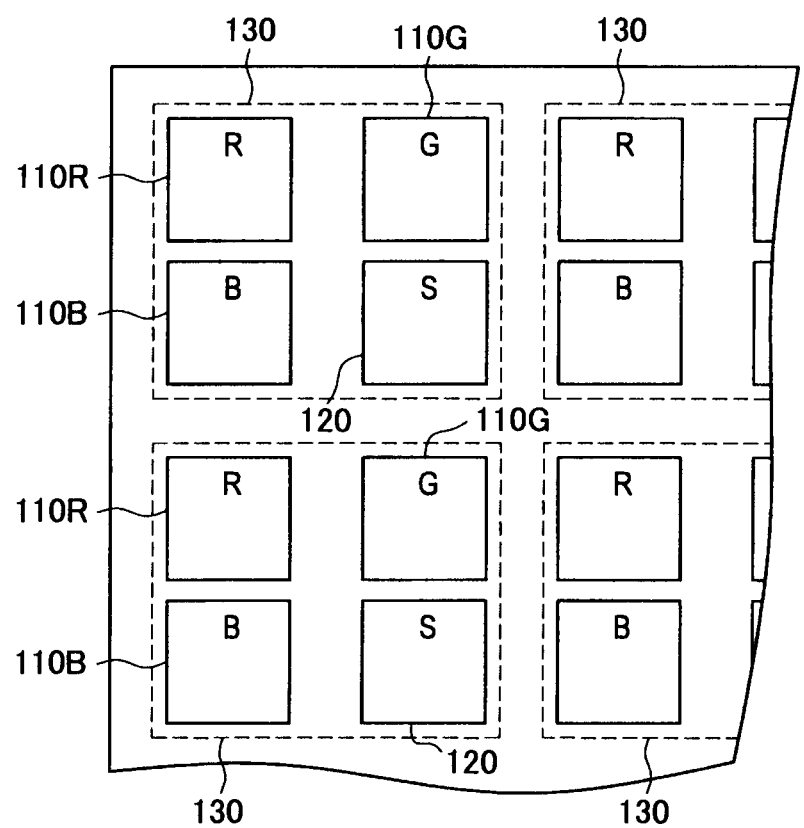
FIG. 2 is an explanatory diagram showing a pixel domain of a display panel according to the embodiment.

FIG. 2 is an explanatory diagram showing a pixel domain of the display panel 108 according to the present embodiment. On the display panel 108, a plurality of pixel sets 130 are arranged in a matrix. In a pixel set 130, a red display pixel 110R, a green display pixel 110G, a blue display pixel 110B which are light emitting devices, and the light receiving sensor 120 are provided. Within one pixel set 130, the display pixels 110R, 110G, 110B, and the light receiving sensor 120 are arranged being adjacent to each other. In addition, the arrangement of pixels is not limited to that of the example shown in FIG. 2 and a different arrangement is applicable.

With the display panel 108 according to the present embodiment, when a subject of operation such as a finger or hand of a user, or a stylus is brought into proximity to the display surface, the information processing apparatus 100 can detect the subject of operation.

The display control unit 112 drives the display unit 110 by using the input image signals. The display unit 112 performs display processing of the image signals received from the image signal processing unit 114. Furthermore, the display control unit 112 performs composition processing of the displayed data, and generates data which can be viewed by the user on the display unit 110. The data generated in the display control unit 112 are output to the display unit 110.

The received light processing unit 122 receives the electrical signals from the light receiving sensor 120, performs analog-to-digital conversion processing and the like, and generates image signals of each pixel. As a result, image signal processing can be performed in the image signal processing unit 114, so that each calculation based on the image signals can be performed in the control unit 102.

Next, the control unit 102 of the information processing apparatus 100 according to the present embodiment will be described. The control unit 102 includes, for example, a proximity detection unit 161, a covered area calculation unit 162, an on-screen information acquisition unit 163, an overlapped area calculation unit 164, a covered time measurement unit 165, a window shift and arrangement unit 166, and an application software activation unit 167.

The proximity detection unit 161 is one example of a contact and proximity detection unit, and calculates a brightness value for each pixel based on the image signals generated by the received light processing unit 122 and calculates a proximity value using one or more than one brightness values. The proximity value calculated by the proximity detection unit 161 is a value related to contact or proximity between the subject of operation and the surface of the display panel 108. The proximity detection unit 161 detects the contact or proximity between the subject of operation and the surface of the display panel 108 based on the proximity value.

The covered area calculation unit 162 calculates the area of the covered region on the screen covered by the subject of operation. The on-screen information acquisition unit 163 acquires information regarding, for example, the type, number and location of graphical images such as windows (objects), icons, and buttons. In addition, the "object" refers to a graphical image shifted by covering of the display by the user, and in the example described later, refers to a window. The overlapped area calculation unit 164 calculates the area of the region where the covered region and the object are overlapped. The covered time measurement unit 165 measures covered time when the screen of the display panel 108 is covered by the contact or proximity of the subject of operation.

The window shift and arrangement unit 166 is one example of an object display control unit which, when the covered time is longer than a predetermined time, removes from the covered region, a window (object) 174 displayed in the covered region on the screen covered by the subject of operation. Then, for example, the window shift and arrangement unit 166 shifts the object displayed in the covered region to the region outside the covered region and display it. At this time, if there is a plurality of objects, the window shift and arrangement unit 166 may display the plurality of objects in alignments in the region outside the covered region.

Moreover, the window shift and arrangement unit 166 may, when the covered area is larger than a predetermined value, remove the object displayed in the covered region from the covered region. Furthermore, the window shift and arrangement unit 166 may, when the overlapped area is larger than a predetermined value, remove the object displayed in the covered region from the covered region.

The application software activation unit 167 is one example of a new object display control unit which, after the object displayed in the covered region is removed, displays a new object in the covered region. For example, the application software activation unit 167 activates predetermined application software and displays a predetermined window or an operation panel (music player control and the like) in the covered region after the object is removed therefrom.

2. Operation of a First Example According to the Embodiment

Figure 3:
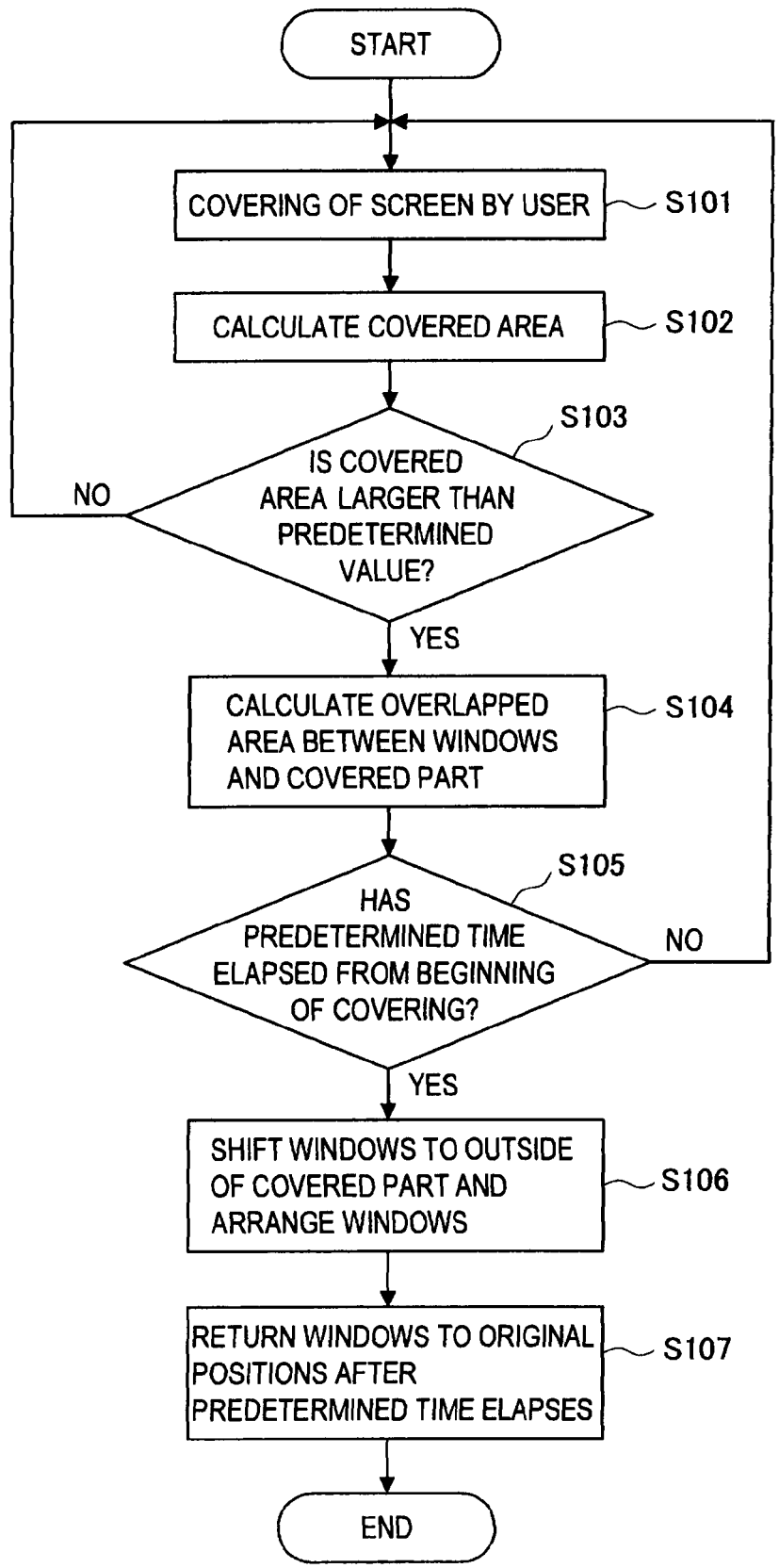
FIG. 3 is a flowchart showing the operation of a first example of the information processing apparatus according to the embodiment.

Next, the operation of a first example of the information processing apparatus 100 according to the present embodiment will be described. FIG. 3 is a flowchart showing the operation of the first example of the information processing apparatus 100 according to the embodiment. FIG. 4 to FIG. 7 are explanatory diagrams showing images displayed on a desktop 170 of the display panel 108 and operation by a user.

The following describes a case where, on the desktop 170 of the display panel 108, the information processing apparatus 100 provides various displays such as images and menu screens based on the image data, and displays graphical images such as windows, icons, and buttons. In the example shown in FIG. 4, there is shown an example in which a plurality of icons 172 and a plurality of windows 174-1, 174-2, 174-3, and 174-4 are displayed on the desktop 170 of the display panel 108. The icons 172 and the windows 174 are displayed being arranged in an overlapping manner.

Figure 5:
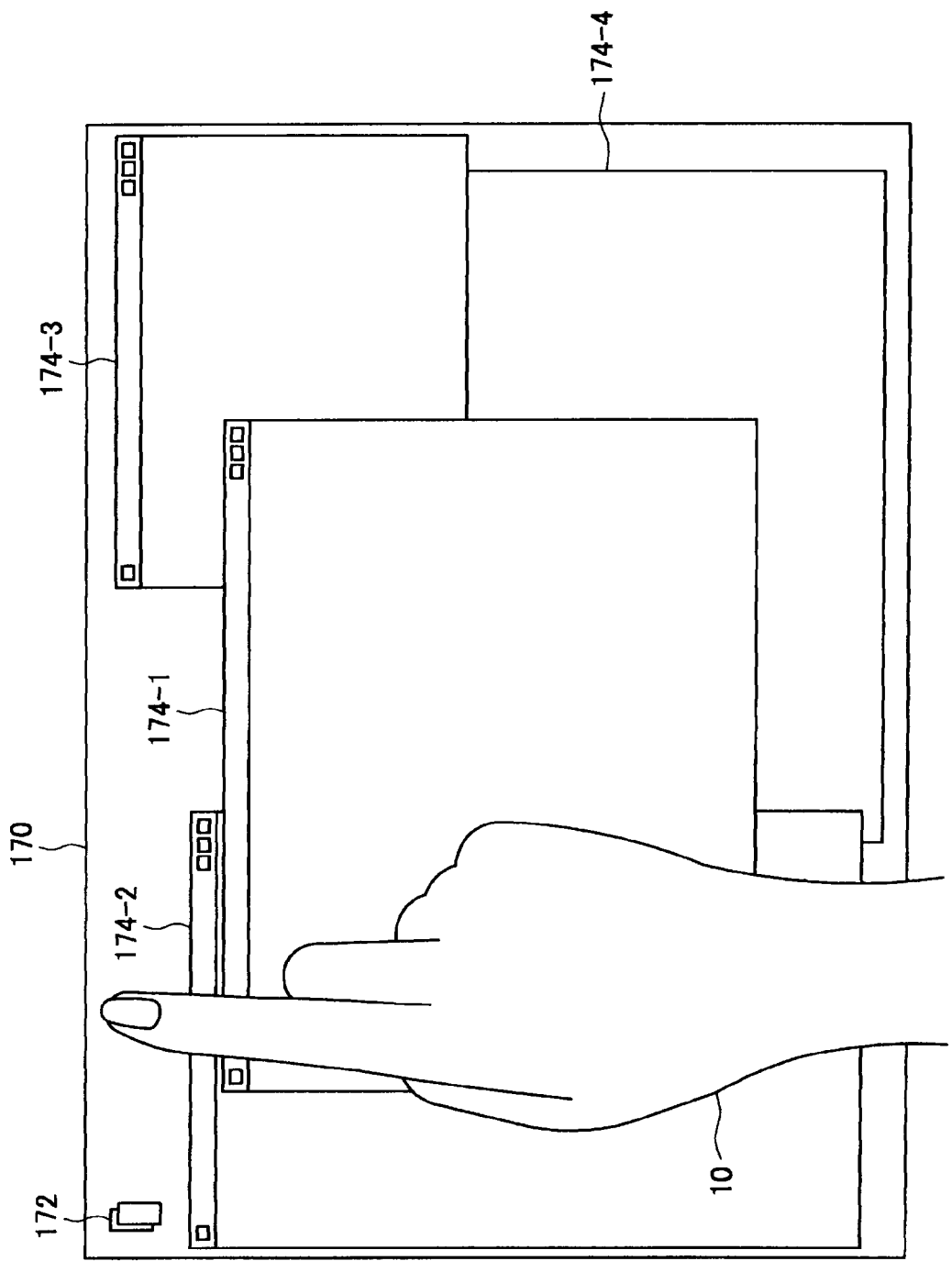
FIG. 5 is an explanatory diagram showing the images displayed on the desktop of the display panel and operation by the user.

Then, as shown in FIG. 5, a subject of operation such as a finger or hand 10 or a stylus is brought into proximity to the screen of the display panel 108 and the display panel 108 is covered by the subject of operation (step S101). At this time, the received light processing unit 122 performs received light processing based on the light detected by the light receiving sensor 120. Next, the control unit 102 calculates a brightness value for each pixel of the image signals generated in the received light processing unit 122. In a circumstance where the user covers the screen with the hand 10, the covered region becomes a region, for example, where the brightness value is higher than that of the region which is not covered. In addition, when the user's hand 10 is recognized as a shadow, the region where the brightness value is low is detected. As a result, the covered region can be detected.

Next, the covered area calculation unit 162 calculates the covered area on the desktop 170 covered by the user's hand 10, based on, for example, the brightness value (step S102). Then the window shift and arrangement unit 166 judges whether the covered area is larger than a predetermined value (step S103). When the covered area is smaller than the predetermined value, the information processing apparatus 100 enters a state of waiting for the user to cover the desktop 170.

On the other hand, when the covered area is larger than the predetermined value, there are calculated the area and coordinates of the overlapped region between the windows 174 and the part covered by the user's hand 10 (step S104).

In addition, when the covered area is larger than the predetermined value, the covered time measurement unit 165 measures the time from the beginning to the end of the covering. Then the window shift and arrangement unit 166 judges whether the covered time is longer than a predetermined time (step S105). When the covered time is shorter than the predetermined time, the information processing apparatus enters a state of waiting for the user to cover the desktop 170.

Figure 6:
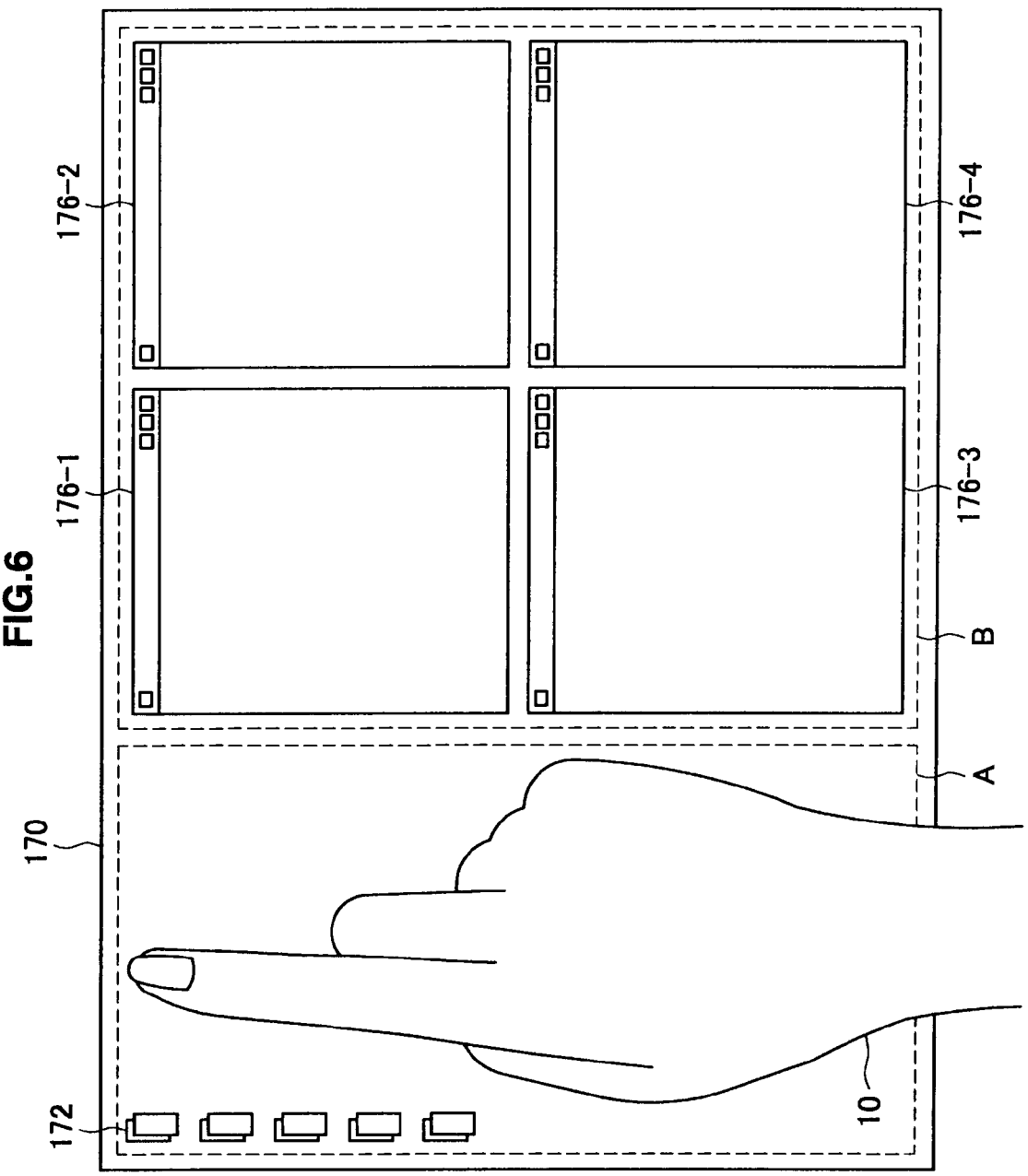
FIG. 6 is an explanatory diagram showing the images displayed on the desktop of the display panel and the operation by the user.
Figure 7:
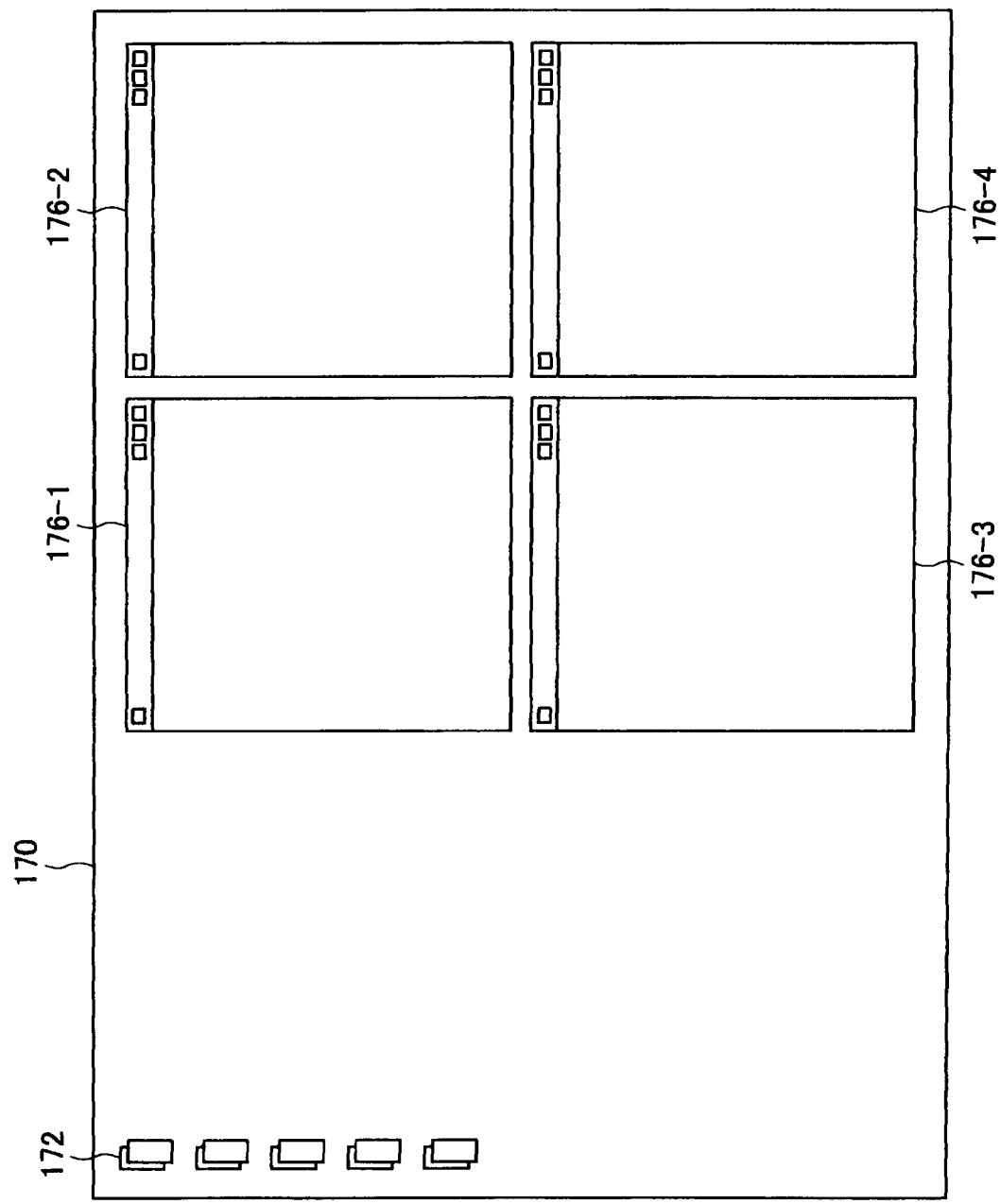
FIG. 7 is an explanatory diagram showing the images displayed on the desktop of the display panel and the operation by the user.

On the other hand, when the covered time is judged longer than the predetermined time, the window shift and arrangement unit 166, as shown in FIG. 6 and FIG. 7, removes the windows 174 displayed in the covered region A on the desktop 170 covered by the user's hand 10 from the covered region A. Then, for example, the window shift and arrangement unit 166 shifts the windows 174 displayed in the covered region A to the region B outside the covered region A and display the windows 174 (step S106). As a result, the windows 174 are not displayed in the covered region A, so that the user can easily select the plurality of icons 172 arranged on the desktop 170.

When the covered area is smaller than the predetermined value or when the covered time is shorter than the predetermined time, the windows 176 are made not to be shifted. Therefore, the operation performed at this time, such as the operation of selecting an icon, hyperlink or the like, and of shifting a window, icon, scrollbar or the like, can be differentiated from the abovementioned operation performed when the covered area is larger than the predetermined value or the covered time is judged longer than the predetermined time. In this manner, when the user's hand or finger is brought into proximity to the desktop 170, operation can be differentiated depending on the size of the area and the length of time.

When the windows 174 are shifted to the region B, as shown in FIG. 7, a plurality of windows 176-1, 176-2, 176-3, and 176-4 may be displayed in alignments in the region B outside the region A on the desktop 170. The windows 176-1, 176-2, 176-3, and 176-4 correspond to the windows 174-1, 174-2, 174-3, and 174-4, respectively. The windows 176-1, 176-2, 176-3, and 176-4 are those that the windows 174-1, 174-2, 174-3, and 174-4 are transformed into.

A method of displaying in alignments is, for example, calculating the area where windows can be displayed within the region B, and dividing the calculated area by the number of windows. Then the location and size of the windows after being shifted are determined.

In addition, the covered region A may be a region having a shape of the hand 10 which is detected by the user's hand 10 being brought into proximity to the desktop, or may be, for example, a rectangular region including the detected region as shown in FIG. 6 and FIG. 7.

Subsequently, after the predetermined time elapses, the windows 176-1, 176-2, 176-3, and 176-4 are returned to the windows 174-1, 174-2, 174-3, and 174-4 in their original locations and forms (step S107). However, the step S107 is not necessary and the arrangement of the windows 176 on the desktop 170 in the state as shown in FIG. 7 may be maintained.

3. Operation of a Second Example According to the Embodiment

Next, the operation of a second example of the information processing apparatus 100 according to the present embodiment will be described. FIG. 8 is a flowchart showing the operation of the information processing apparatus 100 of the second example according to the embodiment. FIG. 9 to FIG. 11 are explanatory diagrams showing images displayed on the desktop 170 of the display panel 108 and the operation by a user.

Figure 4:
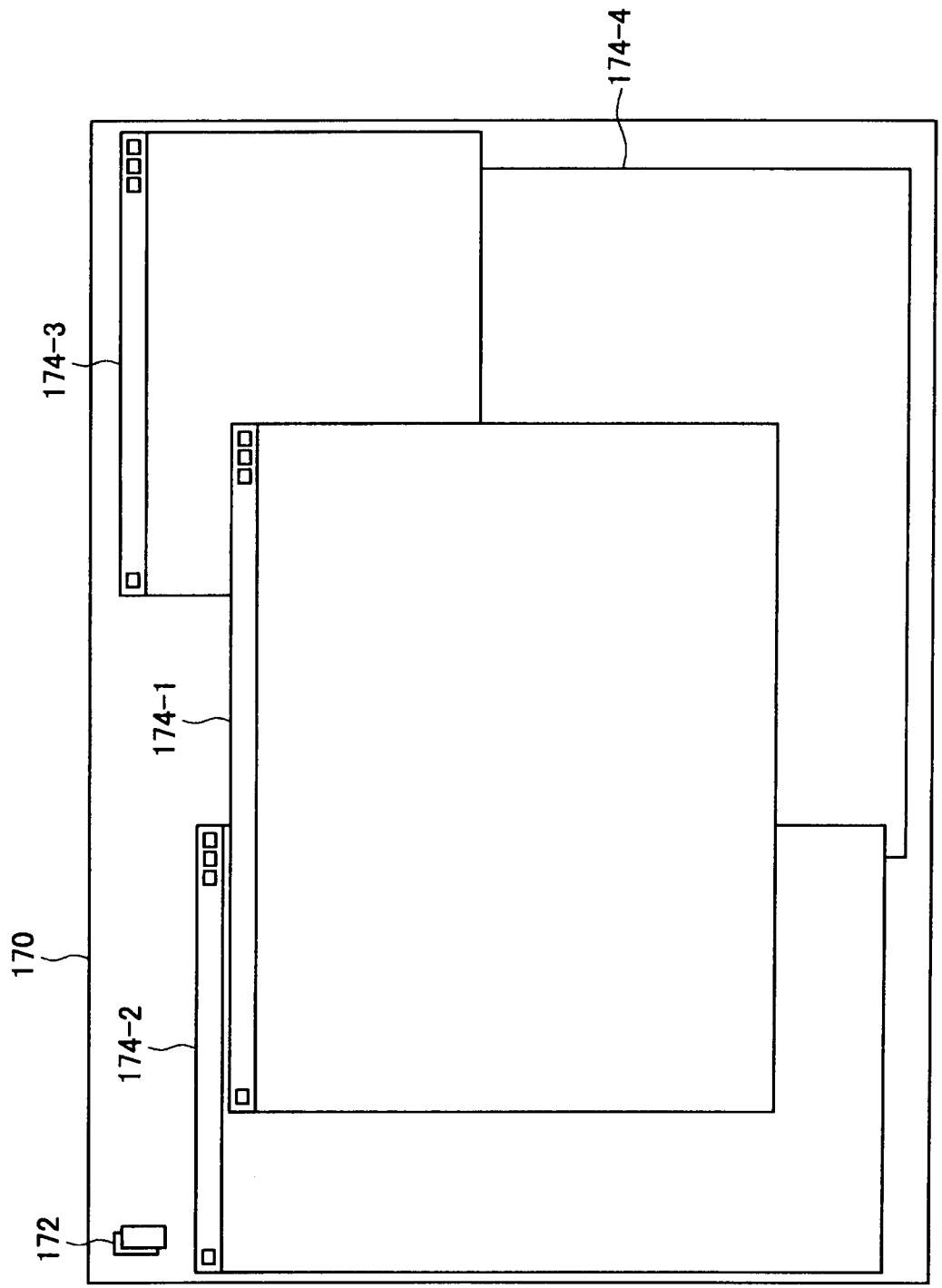
FIG. 4 is an explanatory diagram showing images displayed on the desktop of the display panel and the operation by a user.

The following describes, similarly to the first example, a case where the information processing apparatus 100 provides various displays such as images and menu screens based on the image data, and displays graphical images such as windows, icons, and buttons, on the desktop 170 of the display panel 108. For example, first of all, the plurality of icons 172 and the plurality of windows 174-1, 174-2, 174-3, and 174-4 are displayed on the desktop 170 of the display panel 108 as shown in FIG. 4. The icons 172 and the windows 174 are displayed being arranged in an overlapping manner.

Then, as shown in FIG. 9, a subject of operation such as a finger or hand 10 or a stylus is brought into proximity to the screen of the display panel 108 and the display panel 108 is covered by the subject of operation (step S201). At this time, the received light processing unit 122 performs received light processing based on the light detected by the light receiving sensor 120. Next, the control unit 102 calculates a brightness value for each pixel of the image signals generated in the received light processing unit 122. In a circumstance where the user covers the screen with the hand 10, the covered region becomes a region, for example, where the brightness value is higher than that of the region which is not covered. As a result, the covered region can be detected.

In the second example, there will be described a case where the hand 10 moves from a certain region to other regions on the desktop 170. FIG. 9 and FIG. 10 show the movement of the hand 10 in the order of a hand 10-1, a hand 10-2, and a hand 10-3.

Next, the covered area calculation unit 162 calculates the covered area on the desktop 170 covered by the user's hand 10, based on, for example, the brightness value (step S202). Then the window shift and arrangement unit 166 judges whether the covered area is larger than a predetermined value (step S203). When the covered area is smaller than the predetermined value, the information processing apparatus 100 enters a state of waiting for the user to cover the desktop 170.

On the other hand, when the covered area is larger than the predetermined value, there are calculated the area and coordinates of the overlapped region between the windows 174 and the part covered by the user's hand 10 (step S204). Then the window shift and arrangement unit 166 judges whether the overlapped area is larger than a predetermined value (step S205). When the overlapped area is smaller than the predetermined value, the information processing apparatus 100 enters a state of waiting for the user to cover the desktop 170.

When the covered area is larger than the predetermined value and the overlapped area is larger than the predetermined value, the covered time measurement unit 165 measures the time from the beginning to the end of the covering. At this time, "the covering" includes a case where the user's hand 10 or the like moves in proximity to the desktop. That is, the covered time measurement unit 165 measures the time, from when the covering starts after the user's hand 10 or the like is brought into proximity to the desktop 170, to when the covering ends after the user's hand 10 or the like is separated from the desktop 170. Then the window shift and arrangement unit 166 judges whether the covered time is longer than a predetermined time (step S206). When the covered time is shorter than the predetermined time, the information processing apparatus 100 enters a state of waiting for the user to cover the desktop 170.

On the other hand, when the covered time is judged longer than the predetermined time, the window shift and arrangement unit 166 detects the covered part (the covered region A) which is formed from the beginning of the covering to the separation of the hand 10 or the like (step S207). The window shift and arrangement unit 166, as shown in FIG. 10, removes the windows 174 displayed in the covered region A on the desktop 170 covered by the user's hand 10 from the covered region A. Then, for example, the window shift and arrangement unit 166 shifts the windows 174 displayed in the covered region A to the region B outside the covered region A (step S208).

When the covered area is smaller than the predetermined value or when the covered time is shorter than the predetermined time, the windows 176 are made not to be shifted. Therefore, the operation performed at this time, such as the operation of selecting an icon, hyperlink or the like, and of shifting a window, icon, scrollbar or the like, can be differentiated from the abovementioned operation performed when the covered area is larger than the predetermined value or the covered time is judged longer than the predetermined time. In this manner, when the user's hand or finger is brought into proximity to the desktop 170, operation can be differentiated depending on the size of the area and the length of time.

Unlike the first example, when the windows 174 are shifted to the region B, as shown in FIG. 10, a plurality of windows 276-1, 276-2, 276-3, and 276-4 may be displayed without being aligned in the region B outside the region A on the desktop 170. The windows 276-1, 276-2, 276-3, and 276-4 correspond to the windows 174-1, 174-2, 174-3, and 174-4, respectively. The windows 276-1, 276-2, 276-3, and 276-4 are those that the windows 174-1, 174-2, 174-3, and 174-4 are shifted to the region B.

In addition, the covered region A may be a region having a shape of the hand 10 which is detected by the user's hand 10 being brought into proximity to the desktop, or may be, for example, a rectangular region including the detected region as shown in FIG. 10. The region B outside the covered region A on the desktop 170 is a part where the covered region A is excluded from the whole of the desktop 170.

Then, the application software activation unit 167 activates particular application software (step S209). At this time, as shown in FIG. 11, the window 174 displays a predetermined operation panel 180 (music player control and the like) is displayed in the covered region A where the window 174 is removed therefrom. The particular application software activated by the application software activation unit 167 is what is designated being associated with the covering of the screen by the user.

As mentioned above, according to the present embodiment, the objects (windows) displayed in the covered region on the screen covered by the subject of operation (user's hand 10 or the like) can be promptly and simply removed from the covered region.

For example, when a part of screen is covered by the user's hand 10, windows activated on the part of screen covered by the user can be shifted to an area on the screen outside the part covered by the user, so that an operation region (operation area) where the windows are removed can be made. In the operation region, operation that does not use the activated windows is possible. Moreover, in the method of the present embodiment, the area of the operation area can be changed according to the covered area. Furthermore, with an easy operation procedure in which the user's hand 10 is held over the screen, operations of designating an operation area and shifting a plurality of objects (for example, windows) can be realized at the same time.

With an operation procedure of the present embodiment, windows can be easily shifted to other coordinates as compared to the operation of shifting or reducing the size of windows in the related art. Moreover, in comparison with the related art, an operation area can be promptly secured on the desktop. Furthermore, an operation of shifting only some of the windows is possible as compared to the operation of minimizing all windows at once in the related art.

It should be understood by those skilled in the art that various modifications, combinations, sub-combinations and alterations may occur depending on design requirements and other factors insofar as they are within the scope of the appended claims or the equivalents thereof.

For example, in the abovementioned embodiment, there is described the case where the windows displayed in the covered region are shifted to the region outside the covered region, but the present invention is not limited thereto. For example, windows displayed in the covered region may be minimized and hidden from the desktop.

In addition, in the abovementioned embodiment, as an example where the shifted windows are displayed in alignments, the windows 176 in FIG. 6 and FIG. 7 are shown, but the present invention is not limited thereto. Different forms and arrangements of the windows 176 can be taken according to the number of windows or the size or form of the region.

In addition, in the abovementioned embodiment, there is described the case where windows on the desktop 170 are one example of the object, however the present invention is not limited thereto. For example, in certain application software (such as game software or image editing software), any optional object (graphical image or picture) may be removed or shifted when being covered by a subject of operation such as the user's hand 10 or the like.

For example, in the abovementioned embodiment, as one example of the contact and proximity detection unit, there is described the case where the proximity detection unit 161 calculates a proximity value using one or more than one brightness values, but the present invention is not limited thereto. For example, the contact and proximity detection unit is, for example, a capacitive touch screen, and may include a capacitance detection unit and a proximity value calculation unit. The capacitance detection unit measures capacitance between the user's finger (subject of operation) and the surface of the display unit. The proximity value calculation unit calculates a proximity value using the change in the detected capacitance. For example, according to the change in capacitance, whether the user's finger and the surface of the display unit are in contact with each other or how far they are separated from each other can be calculated. Then, based on the calculated proximity value, similarly to the abovementioned embodiment, the proximity detection unit 161 of the control unit 102 detects contact or proximity of the subject of operation based on the proximity value.

In addition, the contact and proximity detection unit may be a pressure sensitive touch screen, and may calculate a proximity value according to the detected pressure. Then, according to the degree of pressure, contact or proximity of the subject of operation is detected.

The present application contains subject matter related to that disclosed in Japanese Priority Patent Application JP 2008-259621 filed in the Japan Patent Office on 6 Oct. 2008, the entire content of which is hereby incorporated by reference.

What is claimed is:

1. An information processing apparatus, comprising:
   at least one processor;
   a display unit configured to display an image having one or more objects on a screen based on image data using the at least one processor;
   at least one presence detection sensor;
   a proximity detection unit configured to detect at least one of contact and proximity between a user's hand and the screen, based on data received from the at least one presence detection sensor using the at least one processor;

a covered area calculation unit configured to calculate a covered area of a covered region comprising the size of the area that the user's hand is in at least one of contact and in proximity to the at least one presence detection sensor using the at least one processor;

an overlapped area calculation unit configured to calculate an overlapped area of the one or more objects with the user's hand, wherein the overlapped area is the size of the area where the covered region overlaps the object using the at least one processor;

a covered time measurement unit configured to measure a covered time when the screen is covered by at least one of contact and proximity of the user's hand using the at least one processor; and an object display control unit configured to remove the one or more objects from the covered region based on the measured cover time and the calculated overlapped area using the at least one processor, wherein the object display control unit is configured to remove the one or more objects based on the covered region if the covered region represents at least a substantial portion of the user's hand, and wherein the at least the substantial portion of the user's hand is greater than a user's finger that is part of the user's hand.

2. The information processing apparatus according to claim 1,
wherein
the object display control unit is configured to remove the one or more objects displayed in the covered region from the covered region when the covered area is larger than a predetermined value.

3. The information processing apparatus according to claim 2, wherein the covered area includes a portion of the screen in which the user's hand moves about in at least one of contact and proximity to the screen during the covered time.

4. The information processing apparatus according to claim 1,
wherein
the object display control unit is configured to remove the one or more objects displayed in the covered region from the covered region when the overlapped area is larger than a predetermined value and when the covered time is longer than a predetermined time.

5. The information processing apparatus according to claim 1, wherein the object display control unit is configured to shift the one or more objects displayed in the covered region to a region outside the covered region and displays the one or more objects.

6. The information processing apparatus according to claim 5, wherein when the one or more objects is a plurality of objects, the object display control unit is configured to display the plurality of objects in alignment in the region outside the covered region on the screen.

7. The information processing apparatus according to claim 6, wherein the region outside the covered region on the screen is divided into a plurality of portions equal to a number of the plurality of objects removed.

8. The information processing apparatus according to claim 1, further comprising a new object display control unit configured to display a new object in the covered region after the object displayed in the covered region is removed from the covered region.

9. The information processing apparatus of claim 1, wherein the at least one presence detection sensor is at least one light receiving sensor comprising a plurality of pixel sets on the screen, wherein each pixel set comprises at least one color pixel the at least one light receiving sensor.

10. The information processing apparatus according to claim 9, wherein the proximity detection unit is configured to detect at least one of contact and proximity based on brightness values determined for the at least one of the light receiving sensor.

11. An information processing method, comprising the steps of:
displaying an image having one or more objects on a screen of a display unit based on image data;
detecting at least one of contact and proximity between a user's hand and the screen;
calculating a covered area of a covered region comprising the size of the area that the user's hand is in at least one of contact and in proximity to at least one presence detection sensor;
calculating an overlapped area of the one or more objects with the user's hand, wherein the overlapped area is the size of the area where the covered region overlaps the object;
measuring covered time when the screen is covered by at least one of contact and proximity of the user's hand; and
removing the one or more objects from the covered region based on the measured covered time and the calculated overlapped area,
wherein the screen comprises the presence detection sensor,
wherein the at least one of contact and proximity is detected based on data received from the at least one presence detection sensor,
wherein the removing the one or more objects based on the covered region is performed if the covered region represents at least a substantial portion of the user's hand, and
wherein the at least the substantial portion of the user's hand is greater than a user's finger that is part of the user's hand.

12. The information processing method according to claim 11, wherein the object is returned to its original position after a predetermined elapsed time of a lack of at least one of contact and proximity.

13. The information processing method according to claim 11, comprising removing the one or more objects displayed in the covered region from the covered region when the covered area is larger than a predetermined value.

14. The information processing method according to claim 11, comprising removing the one or more objects displayed in the covered region from the covered region when the overlapped area is larger than a predetermined value and when the covered time is longer than a predetermined time.

15. The information processing method according to claim 11, wherein the removing one or more objects from the covered region comprises shifting the one or more objects displayed in the covered region to a region outside the covered region.

16. The information processing method according to claim 15, wherein when the one or more objects is a plurality of objects, displaying the plurality of objects in alignments in the region outside the covered region on the screen.

17. A non-transitory computer readable storage medium having stored thereon a program for causing a computer to perform the steps of:

- displaying an image having one or more objects on a screen of a display unit based on image data;
- detecting at least one of contact and proximity between a user's hand and the screen;
- calculating a covered area of a covered region comprising the size of the area that the user's hand is in at least one of contact and in proximity to at least one presence detection sensor;
- calculating an overlapped area of the one or more objects with the user's hand, wherein the overlapped area is the size of the area where the covered region overlaps the object;
- measuring covered time when the screen is covered by at least one of contact and proximity of the user's hand; and
- removing the one or more objects from the covered region based on the measured covered time and the calculated overlapped area,
- wherein the screen comprises the at least one presence detection sensor,
- wherein the at least one of contact and proximity is detected based on data received from the at least one presence detection sensor,
- wherein the removing the one or more objects based on the covered region is performed if the covered region represents at least a substantial portion of the user's hand, and
- wherein the at least the substantial portion of the user's hand is greater than a user's finger that is part of the user's hand.

18. The non-transitory computer readable storage medium according to claim 17, wherein the program causes removing the one or more objects displayed in the covered region from the covered region when the covered area is larger than a predetermined value.

19. The non-transitory computer readable storage medium according to claim 17, wherein the program causes removing the one or more objects displayed in the covered region from the covered region when the overlapped area is larger than a predetermined value and when the covered time is longer than a predetermined time.

20. The non-transitory computer readable storage medium according to claim 17, wherein the removing one or more objects from the covered region comprises shifting the one or more objects displayed in the covered region to a region outside the covered region.

21. The non-transitory computer readable storage medium according to claim 20, wherein when the one or more objects is a plurality of objects, displaying the plurality of objects in alignments in the region outside the covered region on the screen.

* * * * *